Dec. 24, 1957 R. E. BARNABY ET AL 2,817,779

DRIVE AND MOUNTING MEANS FOR A TUNING FORK STRUCTURE

Original Filed Sept. 17, 1952 4 Sheets-Sheet 1

INVENTORS
ROLAND E. BARNABY
CHARLES T. MORROW
BY
Arthur H. Serrell
ATTORNEY

Dec. 24, 1957 R. E. BARNABY ET AL 2,817,779
DRIVE AND MOUNTING MEANS FOR A TUNING FORK STRUCTURE
Original Filed Sept. 17, 1952 4 Sheets-Sheet 2

INVENTORS
ROLAND E. BARNABY
CHARLES T. MORROW
BY
Arthur H. Serrell
ATTORNEY

Dec. 24, 1957 R. E. BARNABY ET AL 2,817,779

DRIVE AND MOUNTING MEANS FOR A TUNING FORK STRUCTURE

Original Filed Sept. 17, 1952 4 Sheets-Sheet 3

INVENTORS
ROLAND E. BARNABY
CHARLES T. MORROW
BY
Arthur H. Serrell
ATTORNEY

DRIVE AND MOUNTING MEANS FOR A TUNING FORK STRUCTURE

Original Filed Sept. 17, 1952 4 Sheets-Sheet 4

INVENTORS
ROLAND E. BARNABY
CHARLES T. MORROW
BY
Arthur H. Sewell
ATTORNEY

United States Patent Office 2,817,779

Patented Dec. 24, 1957

2,817,779

DRIVE AND MOUNTING MEANS FOR A TUNING FORK STRUCTURE

Roland E. Barnaby, Garden City, N. Y., and Charles T. Morrow, Pacific Palisades, Calif., assignors to Sperry Rand Corporation, a corporation of Delaware Original application September 17, 1952, Serial No. 310,094, now Patent No. 2,753,173, dated July 3, 1956. Divided and this application March 15, 1956, Serial No. 571,825

10 Claims. (Cl. 310—25)

This subject divisional application relates to the drive and mounting means for a tuning fork structure of the character shown and described in U. S. Letters Patent, No. 2,753,173, issued July 3, 1956 for Turn Rate Measuring Instruments.

One of the features of the present invention resides in the provision of an improved tine drive means for the tuning fork in which magnetic pole pieces fixed to the respective tines define two gap defining pole faces constructed and arranged in opposed relation to provide a variable reluctance circuit.

Another feature of the invention is contained in the improved nodal mounting structure provided for the tuning fork.

Other features and structural details of the invention are hereafter set forth in the following description thereof as embodied in the turn rate measuring instrument of the parent application.

Figures 1, 6, 7:
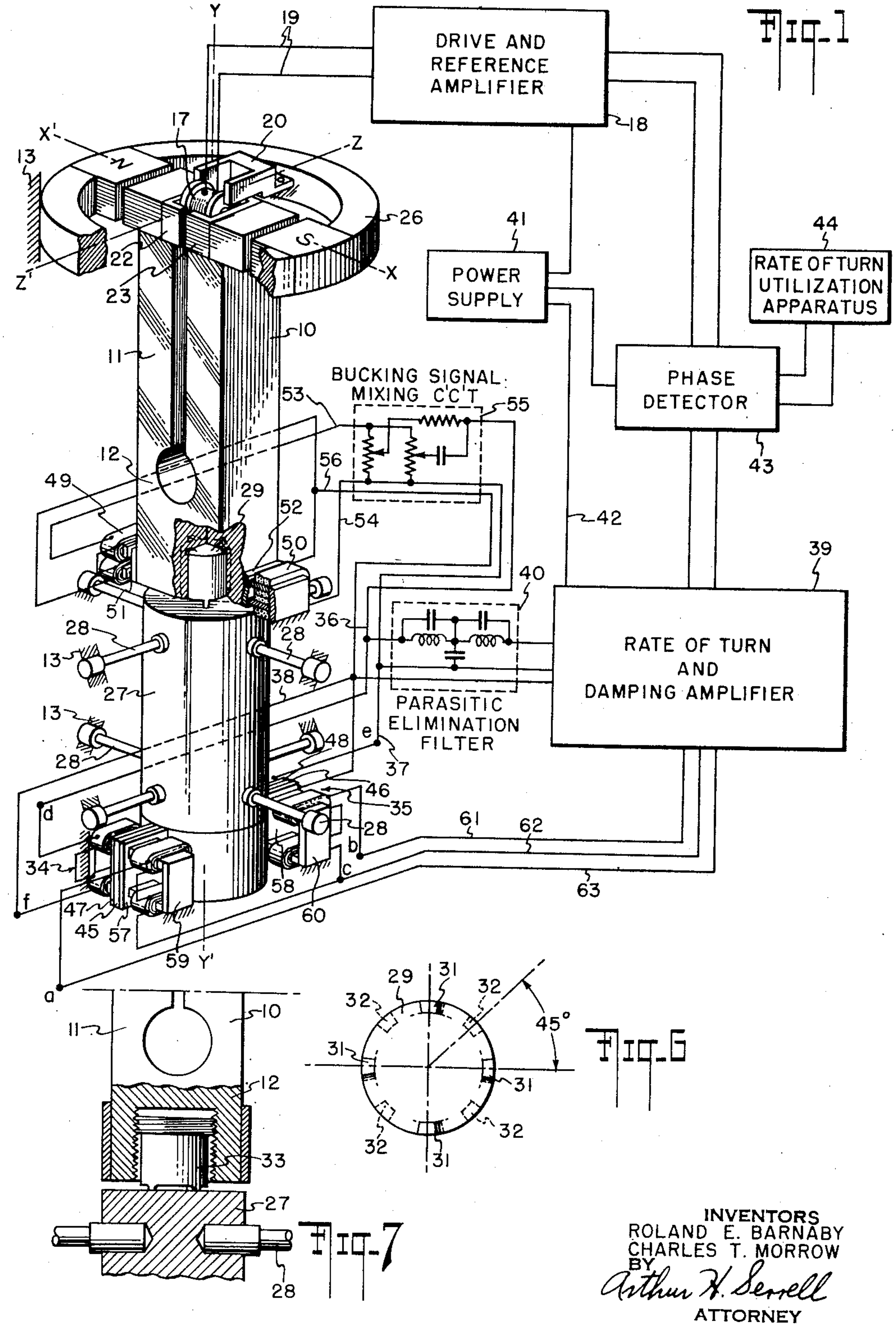
Fig. 1 is a schematic perspective view showing the internal elements of an instrument embodying the present inventive concepts together with a wiring diagram of its components.
Fig. 6 is a detail end view of the nodal coupling element shown in Figs. 1, 2 and 3.
Fig. 7 is a partial vertical section of the character shown in Fig. 2 in which a modified form of nodal coupling element is illustrated.
Figure 2:
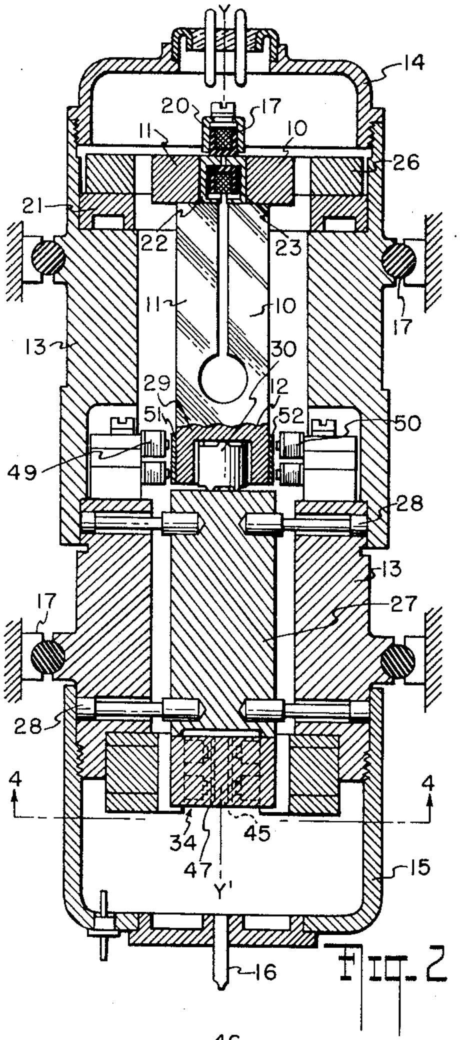
Fig. 2 is a complete detail vertical section of the turn rate instrument, as schematically shown in Fig. 1, along a plane coincident with the normal plane of vibration of the tines.
Figure 3:
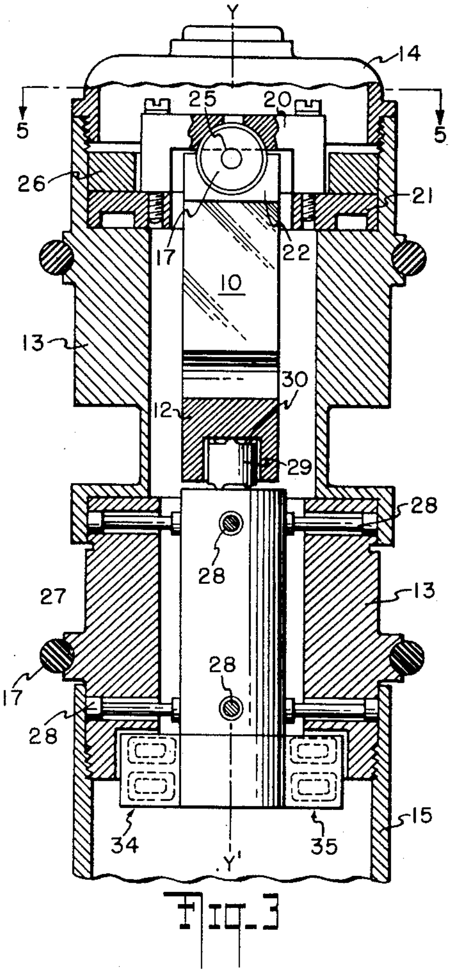
Fig. 3 is a view similar to Fig. 2, taken in a plane at right angles to the normal plane of vibration of the tines.

With particular reference to Figs. 1, 2 and 3, the instrument shown includes a tuning fork whose tines 10 and 11 are adapted to normally vibrate in a plane defined by the axes XX', YY'. The axis of symmetry of the fork is designated by the noted axis YY'. The pair of tines 10 and 11 of the tuning fork are resiliently connected by a heel portion designated at 12. A mounting is provided for the oscillating fork of the instrument that includes a rigid housing member 13, Figs. 2 and 3. As shown, member 13 is tubular in form and includes top and bottom closing caps 14 and 15 that are suitably connected thereto. In the finished instrument, the connections between the parts of the housing member are hermetically sealed and the housing is evacuated by way of tube 16. The housing for the instrument thus provides an airtight enclosure for the fork and other operating parts thereof. As shown in Figs. 2 and 3, the rigid housing member is fixed to the body or craft whose turn rate is to be measured through suitable shock absorbing rings 17a. The arrangement of the instrument on the craft is such that the axis YY' of the device is situated in coincident or parallel relation to the axis of the craft or body for which the information provided by the instrument is desired. It will be understood the rigid housing member 13 of the instrument moves with the body or craft as movement occurs about the axis YY' of the instrument.

Figure 5:
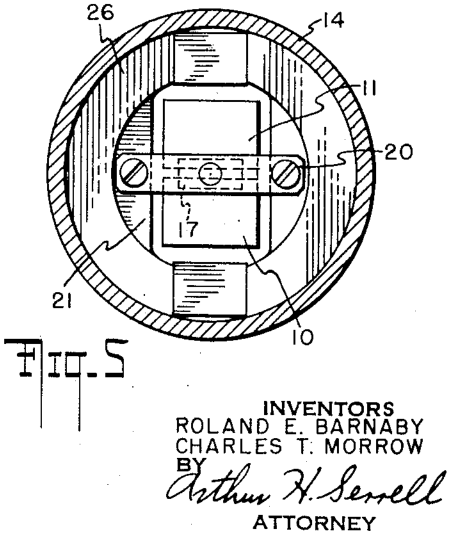
Fig. 5 is a section view taken on lines 5—5, Fig. 3.
Figure 11:
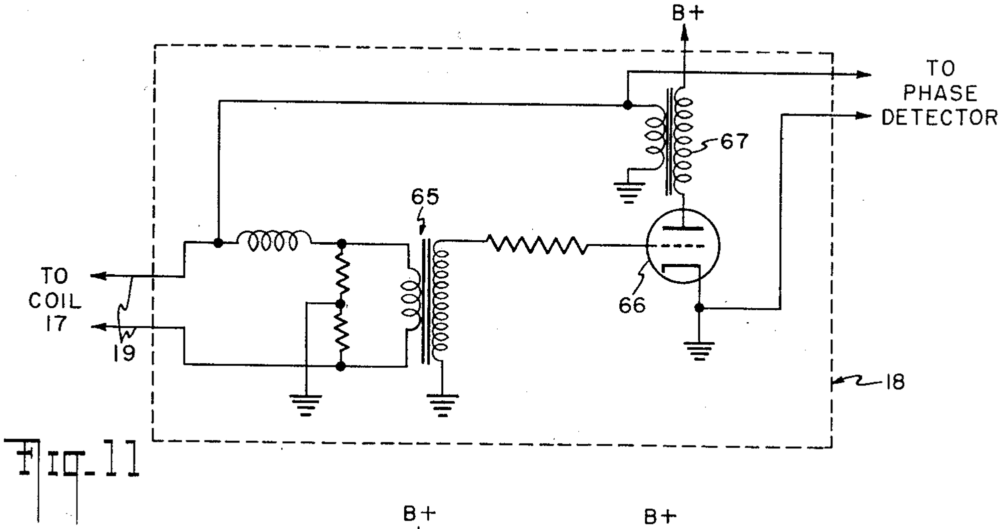
Fig. 11 is a circuit diagram showing the elements and connections of the part of the instrument designated in Fig. 1 as the drive and reference amplifier.

The need for a complex adjusting structure for accurately positioning the coils of the tine driving means, as provided in the U. S. Patent No. 2,683,596, issued July 13, 1954, has been obviated in the improved instrument. In accordance with the present invention, as shown in Figs. 1, 2, 3 and 8, the tines 10, 11 of the non-magnetic tuning fork are oscillated at a frequency corresponding to its natural vibration frequency by a tine drive means which includes a coil 17 that is energized by pulsating or alternating current electrical energy from a drive and reference amplifier 18 by way of leads 19. With reference to Fig. 11, the voltage in input transformer 65 is proportional to the amplitude of vibration or oscillation of the tuning fork. This voltage is amplified by vacuum tube 66 and drives the output transformer 67. The output of transformer 67 is returned to the drive coil 17 in proper phase relationship to sustain the fork's oscillation and is also the phase reference output that is fed the phase detector 43. As particularly shown in Figs. 3 and 5, the coil 17 is fixedly mounted on the rigid housing member 13 of the device by means of a bracket 20 and a connecting disc 21 that is suitably secured to the inner wall of member 13. The coil is so located within the housing member 13 that its axis is in the plane XX', YY' of tine vibration and perpendicular to the axis YY' of symmetry of the tuning fork.

Figure 8:
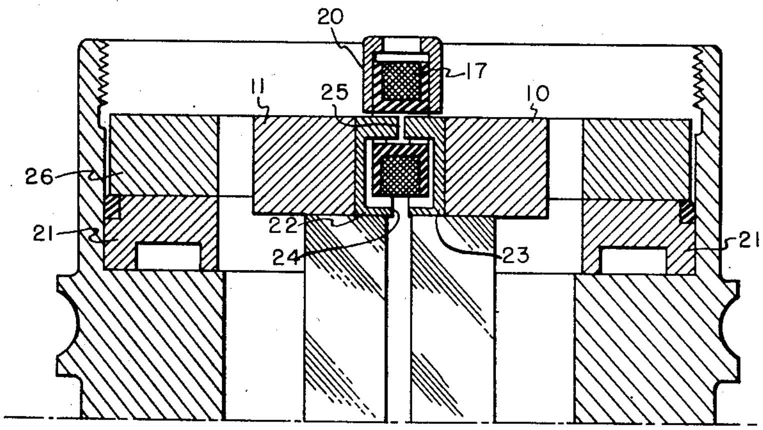
Fig. 8 is an enlarged elevation view, partly in section of the improved tine drive means.
Figure 9:
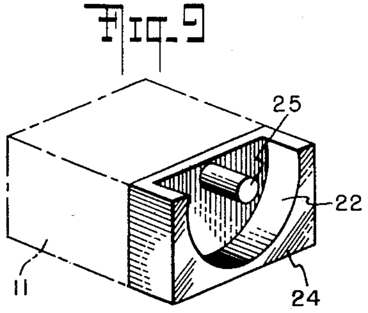
Fig. 9 is a detail perspective view of one of the pole pieces of the tine drive means.

The improved electromagnetic drive means for the tines further includes a variable reluctance magnetic circuit having a pole piece fixed to each of the tines. Each of the pole pieces consists of two pole faces that are arranged in opposing spaced relation to provide two gaps of unequal length. The pole pieces indicated at 22 and 23 may be fixed to the respective tines 11 and 10 in a brazing operation or otherwise connected thereto. As shown in Figs. 8 and 9, the pieces 22 and 23 are constructed and arranged so that the area of the closest of the opposing pole faces is smaller than the area of the other pole faces. The pole face area of the widest spaced pole faces is larger than the pole face area of the other pole faces. The larger of the pole face areas is indicated at 24 in Fig. 9. The smaller of the pole face areas is indicated at 25. The two opposing pole face areas 25 as shown in Fig. 8 are closer than the two opposing pole face areas 24. A permanent magnet 26 or other suitable magnetic field-producing means is arranged on the member 13 to polarize the pole pieces of the variable reluctance circuit with a uniform magnetic field. As shown, magnet 26 is suitably fixed within the member 13 with its field parallel to the axis of the coil 17, the arrangement being such as to force magnetic flux through the gaps of the variable reluctance circuit in parallel. The coil 17 is suspended about one of the gaps of the variable reluctance circuit without touching the tines of the fork in order to produce an alternating flux which passes through the two gaps in series. In the construction shown, the coil 17 is about the gap between the nearest of opposing pole faces. The tine drive operates by virtue of the fact that the two gaps are of unequal length and areas as defined by the pole faces so that although the two alternating fluxes are the same, the two polarizing fluxes are unequal. Although the forces developed from tine to tine in the two gaps oppose each other, the force developed for the larger of the gaps is practically negligible. In the improved device, the drive forces are from tine to tine rather than from tine to housing. This is due to the fact that the alternating current flux path is localized in the fork tine pole pieces and consequently the force between the tines is likewise localized and independent of the housing. The polarized flux emanating from the permanent magnet structure located on the disc 21, which is a part of the external housing, experiences negligible change in level due to alternating flux effecting the drive of the tines and accordingly substantially all of the drive forces are localized in the pole piece structure of the tines. The linkage of the fluxes produced by the coil in the magnetic circuit is accordingly only between the pole pieces of the respective tines. No portion of the magnetic circuit is fixedly contained on the housing structure so that the housing is isolated from the tine drive which is effective between the tines instead of between the tines and the housing.

As shown, the tuning fork and tine drive means are located at the top end of the housing member 13. The lower end of the housing member 13 includes the output measuring means or torsion pick-off, the damping means, and the mounting structure interconnecting the tuning fork and housing member 13.

The mounting structure for the fork of the device further includes an intermediate rigid member in the form of a torsion shaft 27. Member 27 is symmetrical relative to the axis YY′ of the fork and extends along the fork axis which corresponds with the torsion axis of the device. As shown, the members 13 and 27 are resiliently coupled by a plurality of spokes 28 directed radially of the fork axis and fixedly connected at the respective ends thereof to the respective members. Four of such spokes interconnect the top of the torsion shaft and member 13 and four of such spokes interconnect the lower portion of the shaft and member 13. The spokes supporting the shaft 27 produce a torsion resonance at fork frequency but no other resonance near the fork frequency.

We have accordingly provided an instrument responsive to turning movements of a body or craft about an axis which has extreme ruggedness and long-term stability. For perfect stability, i. e., no drift in the absence of turning movement, it is theoretically sufficient to have the torsional mounting members of the fork completely free from all vibration at fork frequency except that due to the turning movement. In practice, however, it is extremely difficult to isolate the tuning fork mounting completely from all undesired vibrations. However, by means of a nodal coupling and a torsional vibration compensator as hereinafter described, we have reduced the effect of the undesired vibrations to a minimum so that the device has an exceptionally low drift rate.

Figure 10:
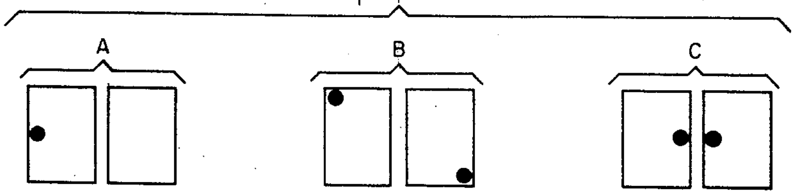
Fig. 10 is a schematic view showing the ends of the tuning fork of the device in three conditions of mass unbalance.

In devices of this character, one of the major causes of spurious or undesired vibrations arises from mass unbalance in the vibrating tines of the tuning fork. These undesired vibrations may produce direct or indirect spurious torsional vibrations about the sensitive axis or axis of symmetry YY′ of the fork. With reference to Fig. 10, one of the primary spurious vibrations caused by mass unbalance of the tines may be a rocking or translational vibration parallel to the tine motion, in the plane defined by the axes XX′, YY′, caused by mass unbalance as illustratively represented by the dot in part A of Fig. 10. Another spurious vibration may be torsional in character. This vibration may occur about the axis YY′ of symmetry of the fork and is caused by the type of mass unbalance represented by the dots in part B of Fig. 10. A third spurious vibration may occur along or parallel to axis YY′ of symmetry of the fork. This is caused by the type of tine unbalance represented by the dots in part C of Fig. 10. Still a further type of spurious vibration which is directed along or radially of the axis YY′ is that due to distortion in the heel 12 of the fork caused by bending of the tines during normal vibration.

The spoke structure described heretofore provides maximum structural rigidity along the XX′, ZZ′ axes and minimum compliance along the YY′ axis. The constraint provided by the spoke structure about the YY′ axis is such to provide a natural frequency the same as the fork frequency.

In accordance with the present invention, spurious vibrations of the axial type and that due to heel distortion of the fork are isolated by a coupling member or post 29. As shown in Figs. 1, 2 and 3, the heel of the tuning fork is provided with an axial recess or opening therein whose inside wall perpendicular to the axis of symmetry YY′ of the fork is situated at a nodal plane in the fork, i. e., a plane in the heel of the fork that is subject to minimum distortion when the tuning fork is in vibration. The nodal plane is designated at 30 in Figs. 2 and 3. The rigid coupling member 29 as shown in detail in Fig. 6 may include a plurality of bosses or projections 31 spaced in equiangular relation about the axis of symmetry of the fork on the top surface thereof. The bottom surface may include a further series of symmetrically spaced bosses or projections 32. The bosses 31 of coupling member 29 are connected by a brazed joint to the nodal plane recessed portions of the heel of the fork. A similar joint connects the bosses 32 of the coupling member 29 with the rigid member or shaft 27 in a plane parallel to the nodal plane. As shown in Fig. 6, the bosses 31 and 32 in the respective parallel connecting planes are arranged in symmetrically spaced relation to one another.

A modified form of the improved nodal coupling structure described is shown in Fig. 7. In this arrangement the recess in the heel of the fork is screw threaded. The coupling member 33 is a plug similar to member 29 whose upper part is screw threaded to mesh with the threads in the heel. The parts are connected by a brazing operation at an approximate nodal plane in the heel portion of the fork defined by the top of the coupling member 33. The connection to the top of the shaft 27 of coupling member 33 is the same as that provided for coupling member 29. Both of the described nodal posts are substantially contained within the axial recess provided in the heel portion of the tuning fork. The nodal posts 29 and 33 are included as a portion of the mounting means for the tuning fork interconnecting the heel of the fork and the intermediate rigid member or shaft 27.

Figure 12:
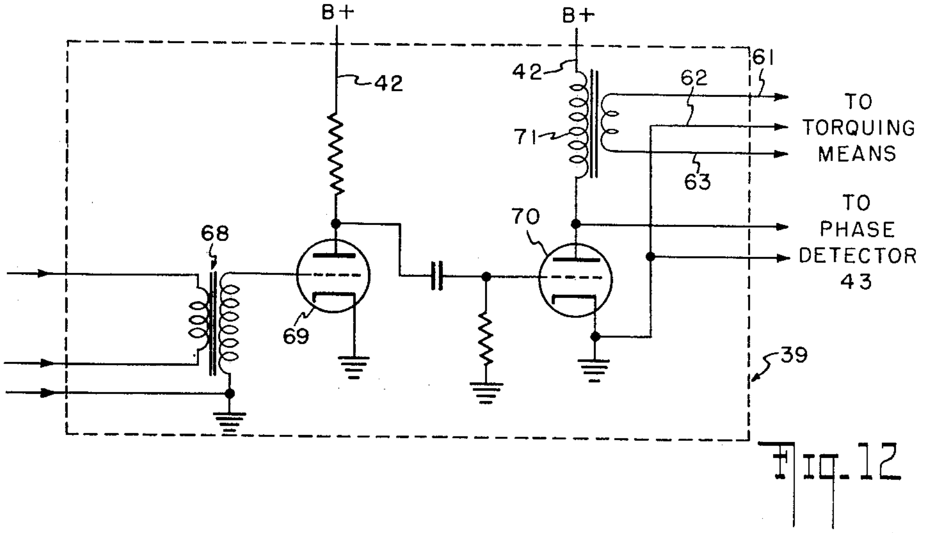
Fig. 12 is a view similar to Fig. 11 showing the components of the part of the instrument designated in Fig. 1 as the rate of turn and damping amplifier.

As explained in the U. S. Patent No. 2,513,340, issued July 11, 1950 as the tines 10 and 11 are rapidly vibrated in the plane defined by the axes XX′, YY′, and housing member 13 is moved about the axis YY′, the tuning fork can preserve angular momentum only by executing a torsional vibration about the YY′ axis proportional to the rate of the turning movement of the housing member. The magnitude and phase of this torsional vibration are expressed electrically by the torsion pick-off means indicated at 34 and 35 in Figs. 1, 2 and 3. The pick-off means 34 and 35 provide the rate measuring output of the device. As shown, the signal from the pick-off means 34, 35 is supplied by way of leads 36, 37 and 38 as one of the inputs to a rate of turn and damping amplifier 39 through a parasitic elimination filter 40. With reference to Fig. 12, the rate signal is applied to input transformer 68 and amplified by vacuum tubes 69 and 70. The output of tube 70 is fed to phase detector 43 and is further applied to output transformer 71. The output of transformer 71 is applied in proper phase relationship to the coils of a torquing means hereinafter described. Amplifier 39 is also connected to power supply unit 41 by way of lead 42. One of the outputs of the rate signal amplifier 39 may be applied to a phase-sensitive detector 43 in which it is compared with the reference signal from the drive and reference amplifier 18 to thereby obtain a resultant signal of phase and amplitude proportional to the rate of turning movement of the housing member 13 about axis YY′. The output of the phase detector 43 is connected to a suitable utilization apparatus 44 which may take the form of a meter that is calibrated to represent a measure of the rate of turn about axis YY′ of the housing member 13. The utilization apparatus is controlled by the output of the device as provided by pick-off means 34, 35 and amplifier 39.

Figure 13:
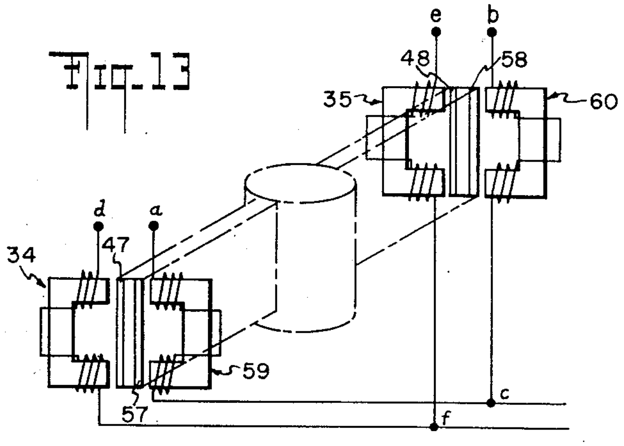
Fig. 13 is a wiring diagram showing the circuitry of the coils of the output pick-off and damping torque motor of the instrument.

The pick-off means 34 and 35 shown in Figs. 1 and 13 of the drawings are similar to the electromagnetic type of pick-off illustrated and described in U. S. Patent 2,683,596, issued July 13, 1954. The coils of the parts of the pick-off means are connected in series relation and provide a single output. The magnetic and coil element parts of the respective units forming the pick-off are fixedly mounted in the lower section of the rigid housing member 13, one of such magnet and coil elements being clearly shown in Fig. 1. The armature parts of the output providing device are fixedly mounted on respective oppositely disposed radial projections relative to axis YY′ extending from a piece that is fixedly connected to the lower end of the intermediate rigid member or shaft 27. The radial projections or bosses on which the armatures are secured are indicated at 45 and 46. The armatures which are suitably fixed to the projections are indicated at 47 and 48. The spacing between the component armature and field elements of the respective parts of the pick-off means is uniform in the absence of torsional vibration of member 27. With vibration of member 27 about axis YY′ due to the effect thereon of the sensitive element of the device or tuning fork, the pick-off means provides a corresponding electrical output proportional to the rate of turning movement of housing member 13 about axis YY′.

Spurious torsional vibrations such as due to unbalance of the tines of the type B in Fig. 10 are compensated for in the improved device by correcting the output of the device from the pick-off means 34, 35 by an electrical signal in accordance with the frequency and amplitude of tine vibration. Such a signal is obtained in the present instance by an additional pick-off means which may be of the character described to provide the output of the device. As shown in Figs. 1, 2 and 3, the magnet and coil parts 49, 50 are fixedly connected in opposite positions in the upper portion of the rigid housing member 13. The respective armature elements for the parts 49, 50 are fixedly connected to the heel portion of the respective tines 10, 11. These elements are respectively indicated at 51 and 52, the same being located in opposite relation on the outside lower surfaces of the respective tines. With the described pick-off means, an electrical signal is obtained that provides a measure of the frequency and amplitude of the tine vibration. This signal is fed to the filter 40 in opposition to the spurious output from the torsional pick-off means 34, 35 to affect the necessary compensation. As shown in Fig. 1, leads 53 and 54 from the frequency signal pick-off means connect with the filter input leads 36 and 37 by way of a bucking signal mixing circuit designated at 55. Common lead 56 from the frequency signal pick-off connects with common lead 38 of the pick-off means 34, 35.

Figure 4:
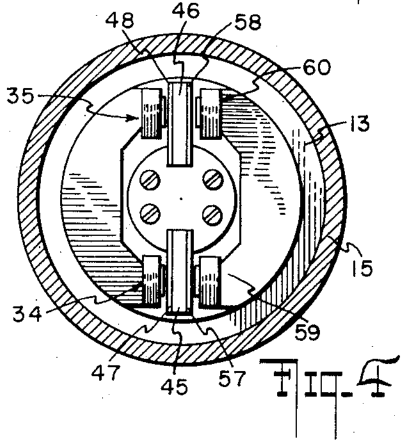
Fig. 4 is a section view taken on lines 4—4, Fig. 2.

After operation of the device with completion of the turning movement, the torsional vibration caused by the tuning fork should be brought to a stop in as short a time as possible. Such a damping operation should also occur at a predetermined rate. The damping means provided in the improved device is an electrical torque exerting means that is effective about the axis of symmetry of the tuning fork. The structure of the torquing means is the same as the pick-off means 34, 35, the same being electromagnetic and including two armature parts 57 and 58 and two magnetic flux conducting and coil parts 59 and 60 as particularly shown in Figs. 1, 4 and 13. These figures are related by the notations on the common leads at points *a, b, c, d, e* and *f*. The wound core parts 59 and 60 of the structure are flux conducting, the same being fixedly mounted in the lower portion of the housing member 13. The armatures 57 and 58 are respectively fixedly connected to the radial projections 45 and 46 that form an integral part of the rigid intermediate member or torsion shaft 27. The coils of the torque motor are energized by way of leads 61, 62, 63 from the output of the rate of turn and damping amplifier 39 so that the device is properly damped.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The combination of, a tuning fork having a pair of resiliently connected tines adapted to vibrate in a plane including the axis of symmetry of the fork, means for mounting said fork, electromagnetic drive means for the tines including a variable reluctance magnetic circuit having a pole piece fixed to each of the tines consisting of two pole faces arranged in opposing spaced relation to provide two gaps of unequal length with unequal polarizing fluxes therebetween, the area of the closest of the opposing pole faces being smaller than the area of the other of the pole faces, means for polarizing the pole pieces of said magnetic circuit with a uniform magnetic field, and a coil energized by pulsating electrical energy fixed to said mounting means between the pole pieces with its axis in the plane of tine vibration and normal to the axis of symmetry of the fork whose flux linkage in the magnetic circuit is only between the pole pieces.

2. The combination of, a tuning fork having a pair of resiliently connected tines adapted to vibrate in a plane including the axis of symmetry of the fork, means for mounting said fork, electromagnetic drive means for the tines including a variable reluctance magnetic circuit having a pole piece fixed to each of the tines consisting of two pole faces arranged in opposing spaced relation to provide two gaps of unequal length with unequal polarizing fluxes therebetween, the area of the closest of the opposing pole faces being smaller than the area of the other of the pole faces, a permanent magnet fixed to said mounting means and arranged to polarize the pole pieces of said magnetic circuit, and a coil energized by pulsating electrical energy fixed to said mounting means between the pole pieces with its axis in the plane of tine vibration and normal to the axis of symmetry of the fork whose flux linkage in the magnetic circuit is only between the pole pieces.

3. Drive means for the tines of a non-magnetic tuning fork with an axis of symmetry including a variable reluctance magnetic circuit having a pole piece fixed to each of the tines consisting of two pole faces arranged in opposing spaced relation to provide two gaps of unequal length with unequal polarizing fluxes therebetween, the area of the widest spaced pole faces being larger than the area of the other pole faces, means for polarizing the pole pieces of said magnet circuit with a uniform magnetic field, and a coil energized by alternating current electrical energy fixedly mounted between the pole pieces whose flux linkage in the magnetic circuit is only between the pole pieces.

4. Drive means for the tines of a tuning fork with an axis of symmetry including a variable reluctance magnetic circuit having a pole piece fixed to each of the tines consisting of two pole faces arranged in opposing spaced relation to provide two gaps of unequal length with unequal polarizing fluxes therebetween, the area of the widest spaced pole faces being larger than the area of the other pole faces, a fixedly mounted permanent magnet arranged to polarize the pole pieces of said magnetic circuit, and a coil energized by alternating current electrical energy fixedly mounted between the pole whose flux linkage in the magnetic circuit is only between the pole pieces.

5. In combination, a tuning fork with an axis of symmetry having a heel with an axial recess therein and a pair of tines vibrating in a plane including the axis, a mounting for the fork including a rigid member movable about the axis of the fork, an intermediate rigid member with symmetry about and extending along the axis of the fork resiliently coupled to the first rigid member, and a coupling member between said fork and intermediate member connected to said heel within the axially recessed portion thereof at a nodal plane perpendicular to the axis of symmetry of the fork, said coupling member isolating said intermediate member from vibrations due to distortion of the heel of the fork.

6. In combination, a tuning fork with an axis of symmetry having a heel with an axial recess therein and a pair of tines vibrating in a plane including the axis, a mounting for the fork including a rigid member movable about the axis of the fork, an intermediate rigid member with symmetry about and extending along the axis of the fork, means for resiliently coupling said members comprising a plurality of spokes directed radially of the fork axis and fixedly connected at the respective ends thereof to the respective members, and a coupling member between said fork and intermediate member connected to said heel within the axially recessed portion thereof at a nodal plane perpendicular to the axis of symmetry of the fork.

7. In combination, a tuning fork with an axis of symmetry having a heel with an axial recess therein providing a nodal plane perpendicular to the axis of the fork and a pair of tines vibrating in a plane including the axis, a mounting for the fork including a rigid member with symmetry about and extending along the axis of the fork, and a coupling member between said fork and rigid member including a plurality of bosses spaced in symmetrical relation about the axis of symmetry of the fork connected by a brazed joint to the nodal plane recessed portion of the heel of the fork.

8. The combination claimed in claim 7, in which said coupling member includes a second plurality of bosses spaced in symmetrical relation about the axis of symmetry of the fork connected by a brazed joint to the rigid member, the connection being in a plane parallel to the nodal plane with the bosses in the respective planes being arranged in symmetrical spaced relation to one another.

9. The combination of, a tuning fork having a pair of resiliently connected tines adapted to vibrate in a plane including the axis of symmetry of the fork, means for mounting said fork, electromagnetic drive means for the tines including a magnetic pole piece fixed to each of the tines having two gap defining pole faces with unequal polarizing fluxes therebetween constructed and arranged in opposed relation to provide a variable reluctance circuit, means fixed to said mounting means arranged to polarize the magnetic pole pieces of said circuit with a uniform magnetic field, and a coil energized by pulsating electrical energy fixed to said mounting means between the pole pieces with its axis in the plane of tine vibration and normal to the axis of symmetry of the fork whose flux linkage in said circuit is only between the pole pieces.

10. Driving means for the tines of a tuning fork with an axis of symmetry including a magnetic pole piece fixed to each of the tines having two gap defining pole faces with unequal polarizing fluxes therebetween constructed and arranged in opposed relation to provide a variable reluctance circuit, means for polarizing the magnetic pole pieces of said circuit with a uniform magnetic field, and a coil energized by alternating current electrical energy fixedly mounted between the pole pieces with its axis in the plane of vibration of the tines and normal to the axis of symmetry of the fork whose flux linkage in said circuit is only between the pole pieces.

References Cited in the file of this patent

UNITED STATES PATENTS

| | | |
|---|---|---|
| 1,524,868 | Knoll | Feb. 3, 1925 |
| 2,730,665 | Hart | Jan. 10, 1956 |

FOREIGN PATENTS

| | | |
|---|---|---|
| 307,855 | Great Britain | Mar. 13, 1929 |